L. C. BALDWIN.

SPINNING BOBBIN, &c.

No. 10,996. Reissued Apr. 23, 1889.

Witnesses.

W. E. Piper

P. L. Fish

Inventor.

Luther C. Baldwin by Singleton & Piper, atty's.

N. PETERS, Photo-Lithographer, Washington, D. C.

UNITED STATES PATENT OFFICE.

LUTHER CHASE BALDWIN, OF MANCHESTER, NEW HAMPSHIRE.

SPINNING-BOBBIN, &c.

SPECIFICATION forming part of Reissued Letters Patent No. 10,996, dated April 23, 1889.

Original No. 366,196, dated July 12, 1887. Application for reissue filed November 26, 1888. Serial No. 291,915.

*To all whom it may concern:*

Be it known that I, LUTHER CHASE BALDWIN, of Manchester, in the county of Hillsborough and State of New Hampshire, have invented a new and useful Improvement in Spinning-Bobbins, &c., of which the following is a specification.

The ring which I have invented and shall hereinafter describe has that degree of flexibility and is so split and overlapped that it will adapt itself to the bobbin or spool when it is subjected to different degrees of temperature and humidity, both of which qualities will affect the size of bobbins.

I shall describe my device as applied to three forms of bobbins, so as to more clearly show my invention. A groove for receiving the ring is cut around the outside of the bobbin; or, in cases where such groove and ring would interfere with the yarn or thread which may be spun upon the bobbin, the groove may be cut within its bore and the ring compressed and allowed to expand and fit itself into said groove.

Figure 1:
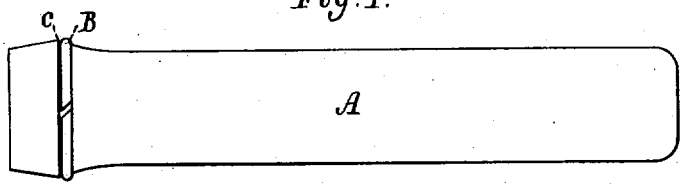
Figure 2:
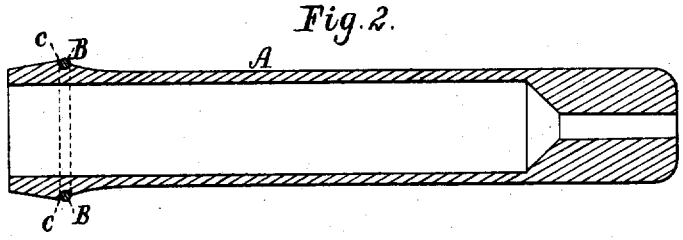
Figure 3:
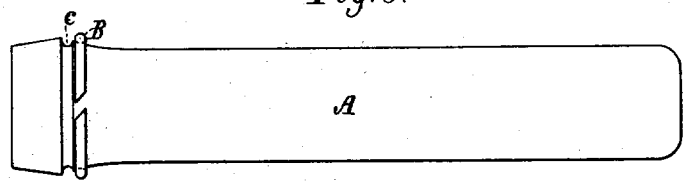
Figure 5:
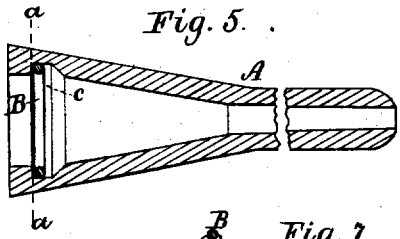
Figure 4:
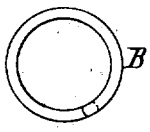
Figure 6:
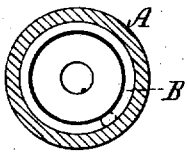
Figure 7:
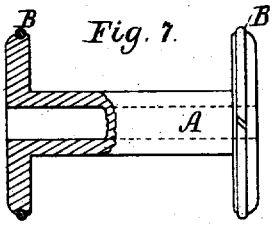
Figure 8:
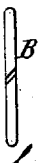

In the accompanying drawings, Figure 1 shows a common form of bobbin with my device applied. Fig. 2 is a longitudinal section of the same. Fig. 3 shows the same bobbin and the ring as it appears just before it springs into the groove upon the outside of the bobbin. Fig. 4 is the ring ready to apply. Fig. 5 is a broken longitudinal section of a modification of a bobbin, showing my device secured within said bobbin. Fig. 6 is a cross-section on the line *a a* of Fig. 5. Fig. 7 is a part section and part elevation of another modified form of a bobbin or spool with my device applied to its ends to prevent splitting and abrasion. Fig. 8 is an edge view of my ring by itself.

In the drawings, A is the bobbin, B the ring. C is the groove for receiving and retaining the ring.

The rings as I make them are made of steel wire, which may be round in section or of any form which will give the most strength. The wire is wound in the form of a spiral spring, and each coil or turn of the wire is cut diagonally and forms a ring having lapping ends. These rings are tempered in the usual manner. When applied to the exterior of a bobbin, the ring is expanded, and, having been pushed into the groove, it contracts and fits itself firmly in the groove, thus tending to hold the bobbin together.

Bobbins are liable to injury by being stepped upon. In this case the ring will sustain the strain. Bobbins may be split from the inside by two causes, first, by being caught upon the top end of the spindle when being removed therefrom; second, the centrifugal force resulting from the rapid revolution of the bobbin when in use. In either of these cases the contractile force of the ring sustains the strain, and even if the bobbin should be split at the bottom end the ring will preserve the proper form and sufficient strength to allow of its use. In case the ring is inserted within the bore of the bobbin, as shown in Figs. 5 and 6, it is applied by being compressed into contracted form, and is then permitted to expand, so as to fill the groove in the bobbin. When thus applied, it sustains any strain from without and receives the outward pressure of the shuttle-spindle, and at the same time protects the wood from being injured by the catch of the shuttle-spindle, which catch extends into the bore of the bobbin and engages in the groove C for the purpose of holding the bobbin in the shuttle while weaving.

The principal points of excellence of my invention are, first, it has great strength combined with sufficient elasticity to adjust itself to variations in size from any cause; second, it is easily applied to a solid bobbin, and requires no glue or other adhesive mixture to hold it in place; third, it protects the wood of the bobbin from being chipped or roughened when applied, as in Figs. 1, 2, 3, and 7; fourth, it weighs so little that its application does not materially increase the weight of the bobbin.

I am aware that it is old to provide bobbins with unsplit or continuous rings which extend below the plane of the surface of the bobbin, and I therefore disclaim such construction.

I am aware that it is not broadly new to provide split bobbins with rings made of steel, and I do not claim such construction, broadly.

In the specification and in the claims annexed thereto I use the word "solid" to distinguish my bobbin, or the kind of bobbin which I desire specially to fit up with a ring such as I have described from an ordinary bobbin which is sawed or split a portion of its length.

What I desire to secure by Letters Patent, and what I therefore claim, is specifically as follows:

1. A solid bobbin provided with a groove which receives and accommodates an elastic ring, in combination with a split elastic ring fitted into said groove, said ring having tapered ends which overlap each other when in position on the bobbin, substantially as described.

2. A solid bobbin provided with a groove, which groove receives and accommodates an elastic ring, in combination with a split elastic ring having overlapping tapered ends and extending in an unbroken curve from end to end, and which ring is sprung into said groove in the bobbin, substantially as described.

3. A solid bobbin provided on its outside with a groove, in combination with a split elastic ring which fits within the groove and extends slightly beyond the plane of the outer surface of the bobbin in a position to receive the wear, substantially as described.

4. The combination of a split elastic ring, and an unsawed or solid bobbin having a groove around it to receive said ring, for the purpose substantially as described.

In testimony whereof I affix my signature in presence of two witnesses.

LUTHER CHASE BALDWIN.

Witnesses:

S. N. PIPER,

C. F. DANIELS.